Patented Mar. 27, 1923.

1,450,004

UNITED STATES PATENT OFFICE.

MARTIN L. MARTUS, OF WOODBURY, CONNECTICUT.

ELECTRODE ELEMENT FOR GALVANIC BATTERIES AND METHOD OF PRODUCING SAME.

No Drawing.    Application filed February 8, 1922.   Serial No. 535,047.

*To all whom it may concern:*

Be it known that MARTIN L. MARTUS, a citizen of the United States, and resident of Woodbury, in the county of Litchfield and State of Connecticut, has invented certain new and useful Improvements in Electrode Elements for Galvanic Batteries and Methods of Producing Same, of which the following is a specification.

My invention relates to electrode elements for galvanic batteries and more particularly to the negative electrodes for batteries of this type, employing a caustic alkaline electrolyte and wherein the positive electrode consists of an element or elements of zinc and the negative electrode consists of an element or elements of oxide of copper.

The invention more particularly relates to negative electrodes of this type for use in primary batteries of the class described, and specifically in the method of coloring or reducing the surface of copper negative electrodes constituted partly or in whole of copper oxide.

Negative electrodes of the above class formed of oxide of copper as almost universally employed are formed of finely ground oxide of copper which in the process of manufacture is mixed and moistened with a suitable binder such as caustic soda. The damp powdered copper oxide is thus formed and shaped by being placed in molds of proper form to produce elements of the required size and shape, and then subjected to a pressing operation which forms the damp powdered material into a compact mass. These elements may be in the form of cylinders as are very generally used by me, or in the form of plates and when so formed are baked for a proper time in a furnace providing the required degree of heat. These elements are also now reduced by several well known methods such as immersion in a chemical mixture or by electrolytic action.

My improvement consists of a novel method of reducing the surface of the electrode and which consists in applying an additional material in the form of powdered metal such as zinc and by means of baking the element in a furnace the atmosphere of which is impregnated with said powdered metal so that the said material will be deposited and baked upon the surface of the electrode to a suitable degree and thickness as may be required. This treatment when applied forms an attractive metallic finish which prevents corrosion and leaves the electrode ready for use and insures immediate results upon being connected up in service.

Having thus described my invention, what I claim and desire to secure by Letters Patent is:—

1. An electrode element for galvanic batteries comprising a moulded mass of oxid of copper combined with a binder of caustic soda and having an outer surface covering of a metal other than copper oxid.

2. An electrode element of galvanic batteries comprising a moulded mass of oxid of copper combined with a binder of caustic soda, and an outer deposited zinc layer produced by baking in an atmosphere impregnated with powdered zinc.

3. An electrode element for galvanic batteries comprising a moulded mass of oxid of copper combined with a binder of caustic soda and having an outer surface covering of a metal other than copper oxid applied and baked on the surface of the electrode.

4. An electrode element for galvanic batteries comprising a moulded mass of oxid of copper combined with a binder and an outer layer of zinc.

5. The method of producing an electrode element for galvanic batteries which consists in forming a mixture of powdered oxid of copper, and caustic soda, then moulding the same to shape and baking the same in an oven containing powdered zinc to deposit thereon an outer zinc layer.

6. The method of producing an electrode element for galvanic batteries which consists in forming a mixture of powdered oxid of copper and caustic soda, then moulding the same and baking it in an atmosphere impregnated with powdered zinc sufficient to form a deposit of zinc on the outer surface of the electrode.

7. The method of reducing negative elements for galvanic batteries which consists in forming a compressed mass of suitable shape from finely powdered oxid of copper and then baking the same in a furnace, the temperature in which is impregnated with powdered zinc and to a degree of heat sufficient to cause a deposit of said zinc upon the outer surface of the electrode.

8. The method of reducing negative electrodes for galvanic batteries which consists in first forming a shaped mass of oxid of copper mixed with a suitable binder, then subjecting the same for a proper length of time to a suitable degree of heat impregnated with powdered metal different from that of which the electrode is formed whereby an outer layer of said metal is deposited thereon.

Signed at Waterbury in the county of New Haven and State of Connecticut this 6th day of February A. D., 1922.

MARTIN L. MARTUS.

Witnesses:
JAMES G. ROSS,
H. T. HUBERT.